United States Patent [19]
Shimizu

[11] 4,451,131
[45] May 29, 1984

[54] INTERCHANGEABLE CAMERA LENS ASSEMBLY

[75] Inventor: Seiichi Shimizu, Kanagawa, Japan

[73] Assignee: Canon Kabushiki Kaisha, Tokyo, Japan

[21] Appl. No.: 310,874

[22] Filed: Oct. 13, 1981

Related U.S. Application Data

[63] Continuation of Ser. No. 122,177, Feb. 19, 1980, Pat. No. 4,299,470.

[30] Foreign Application Priority Data

| Feb. 23, 1979 | [JP] | Japan | 54-20257 |
| Jul. 2, 1979 | [JP] | Japan | 54-91829 |
| Jan. 18, 1980 | [JP] | Japan | 55-5102 |

[51] Int. Cl.³ .................. G03B 17/56; G03B 17/14
[52] U.S. Cl. .................. 354/286; 350/257
[58] Field of Search ............ 354/286; 350/252, 255, 350/257

[56] References Cited

U.S. PATENT DOCUMENTS

| 2,800,052 | 7/1957 | Bechtold et al. | 350/252 X |
| 3,142,239 | 7/1964 | Meixner | 350/252 X |
| 3,858,225 | 12/1974 | Hasegawa et al. | 354/286 X |
| 3,906,534 | 9/1975 | Shirasaki | 354/286 |
| 4,003,068 | 1/1977 | Hashimoto et al. | 354/286 |
| 4,062,030 | 12/1977 | Starp | 350/257 X |

Primary Examiner—Donald A. Griffin
Attorney, Agent, or Firm—Toren, McGeady and Stanger

[57] ABSTRACT

An interchangeable lens assembly for a single lens reflex camera which is divisable into a first and a second lens assembly unit which may be detachably mounted together and which may be, in turn, detachably mounted on a camera.

2 Claims, 18 Drawing Figures

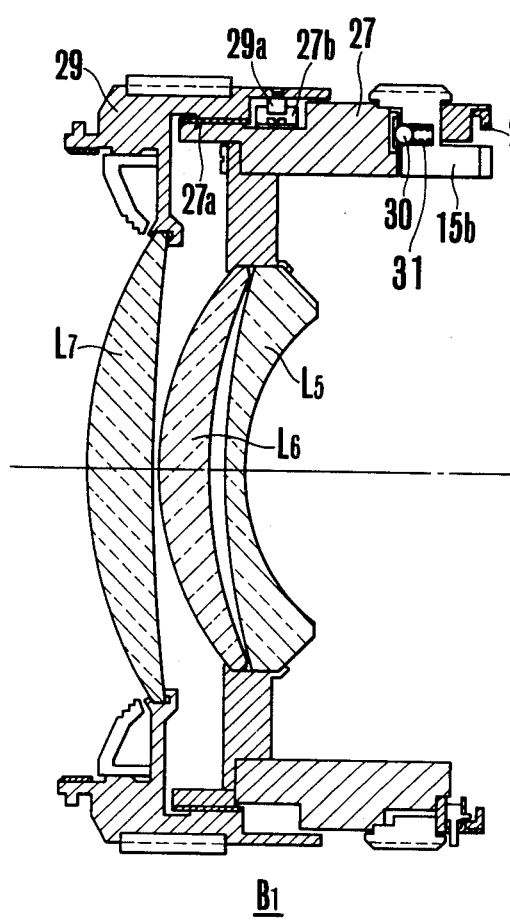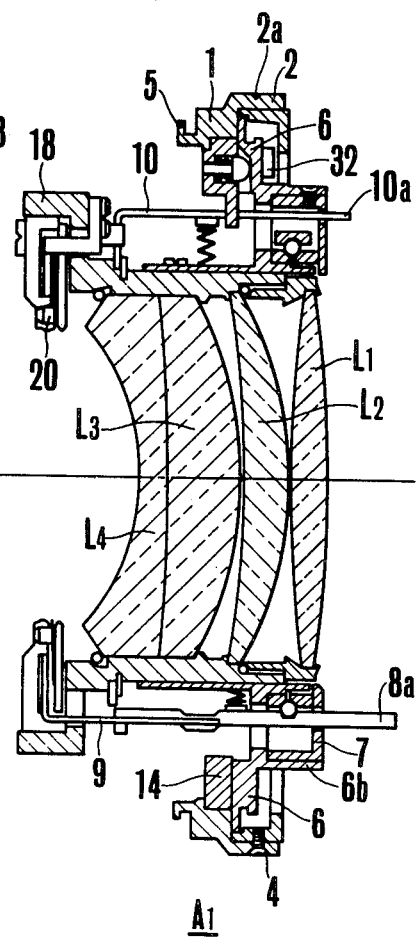

INTERCHANGEABLE CAMERA LENS ASSEMBLY

This is a continuation of Ser. No. 122,177, filed Feb. 19, 1980 and now U.S. Pat. No. 4,299,470 issued Nov. 10, 1981.

The present invention relates generally to photographic equipment and more particularly to an interchangeable lens assembly for a camera. The invention is particularly directed to a lens assembly which is divisable into a first and a second lens assembly unit which may be detachably mounted together and which may be, in turn, detachably mounted on a camera.

In the prior art, it has been known to divide an interchangeable camera lens assembly into a front lens part and a rear lens part. Conventionally known interchangeable lenses of this type have been arranged so that one of the parts of the lens assembly is fixedly attached to a camera body and so that a screw connection may be provided for coupling the other lens assembly part with the camera. Thus, it has generally been found with prior art arrangements to be impossible to freely detach the fixedly attached lens assembly unit or part from the camera body. Accordingly, it has been impossible to enable free selection of the combination of the various assembly units of an overall interchangeable lens assembly.

Furthermore, interchangeable lenses arranged to couple the individual assembly units thereof by screw connections are generally prone to a degradation of the accuracy of the exposure control signals which are necessarily exchanged between the interchangeable lens assembly parts and the camera. This will occur due to the fact that the screw connection devices are susceptible to wear. Furthermore, there will tend to be a variation in the tightening angle of the screw connection means.

Other types of conventionally known camera lens mounting devices include the bayonet type mount or coupling. An interchangeable lens which includes this type of connection means is generally utilized so that when it is to be mounted upon a camera, rotation of the entire lens assembly relative to the camera body operates to effect the desired coupling engagement. Accordingly, in mounting or dismounting a lens including a coupling mechanism of this type, either the position of a datum plane of the lens for mounting the lens on the camera will deviate from that of the camera, or a signal member of the lens will not be precisely aligned with a corresponding member on the camera which is arranged to be in an interlocked association therewith.

In order to prevent these disadvantages from arising, conventional interchangeable lenses have necessarily involved complex structural designs in order to insure that predetermined positioning between the lens parts and camera operating elements will be maintained when mounting and dismounting the lens.

In addition to the foregoing, there is also known a bayonet mount of the so-called spigot type which may be provided for eliminating the aforementioned shortcomings of the bayonet type mounting arrangement.

In the case of a spigot type of bayonet mount, many of the important operative components of the lens assembly, including the optical system of the lens, the diaphragm device, the diaphragm aperture presetting mechanism and the diaphragm interlocking mechanism, are all provided upon a lens barrel or main support tube of the lens assembly. In order to enable the main support tube or lens barrel to remain fixed relative to the camera during mounting and dismounting operating, there is provided a tightening ring which includes the bayonet coupling members thereon which is arranged at one end of the lens barrel for coupling engagement with the camera. In a lens of this type, coupling and decoupling of the lens assembly must be performed by rotating only the tightening ring with the balance of the elements of the lens assembly remaining stationary relative to the camera. Thus, with the spigot type of mounting arrangement, the lens barrel is maintained in a non-rotative state during mounting operation of the lens on the camera. As a result, a datum plane for the mounting assembly will not be subjected to wear and the optical characteristics of the lens assembly remain unchanged.

On the other hand, the tightening operation which must be performed for mounting and dismounting of the lens relative to the camera is sometimes difficult depending upon the type of camera which may be involved due to the fact that only the tightening ring can be grasped during the coupling and decoupling operation.

As a solution to this problem, a new approach has been proposed in the structure and arrangement of interchangeable lens assemblies whereby the lens assembly may be mounted and dismounted from the camera more conveniently by grasping virtually any portion of the overall length of the assembly while at the same time preventing wear of parts and enabling proper alignment of operating elements. In this connection, reference is made to U.S. Pat. Nos. 4,247,190 and 4,230,403. In mounting devices of this type, the overall lens assembly is formed to include an adapter member and a lens barrel structure or main support tube, with the adapter member being mounted to be rotatable relative to the lens barrel when the lens assembly is to be mounted on a camera. With the lens assembly dismounted from the camera, the adapter member is held rotatably fixed relative to the lens barrel or main support tube and all of the other operating elements of the lens assembly, including the coupling means or bayonet devices are arranged on the lens barrel. Since, with the lens assembly dismounted from the camera, the adapter member and the lens barrel are kept in a fixed positional relationship relative to each other, operating members such as a signal member for transmitting exposure control signals between the camera and the lens assembly are maintained in predetermined positions relative to the adapter member with the lens assembly dismounted from the camera. Thus, when mounting the lens assembly on the camera, the bayonet coupling between the lens assembly and the camera may be readily effected by grasping and rotating the lens barrel or main support tube of the lens assembly together with the other operating elements which may be mounted on the lens barrel, such as the focusing ring, the diaphragm setting ring, etc. while the adapter member is held fixed relative to the camera whereby coupling and decoupling of the lens assembly may be readily performed.

The present invention is directed toward an improvement in the aforementioned type of interchangeable lens assembly wherein the lens assembly may be divided into a plurality of lens assembly units in order to obtain interchangeability of the lens units and in order to enable utilization of varied types of lens assembly parts by combining different lens assembly units to form an operative overall lens assembly.

The present invention is further directed to the provision of an interchangeable lens assembly which not only facilitates mounting and dismounting of the assembly relative to a camera by utilization of a mounting arrangement of the aforementioned type, but one which is also capable of maintaining relatively high dimensional optical precision.

The invention is also directed toward provision of a structural arrangement for an interchangeable lens assembly wherein the new mounting and dismounting mechanism mentioned above may be divided into a plurality of parts with a diaphragm setting ring and a diaphragm device being thus arranged separate from each other. As a result, either the diaphragm device or the diaphragm setting ring may be made capable of being interconnected either with one another or with other and different diaphragm setting rings or diaphragm devices, respectively, when the individual units of the lens barrel assembly are mounted in operative combination with a different lens assembly unit.

It is a further aim of the invention to provide a clutch mechanism which will serve to retain an interlocking relationship between the separate lens assembly units in an overall interchangeable lens assembly having the aforementioned characteristics.

SUMMARY OF THE INVENTION

Briefly, the present invention may be described as an interchangeable lens assembly for a camera comprising a first and a second lens assembly unit detachably connected to form said interchangeable lens assembly, said first lens assembly unit comprising: first lens barrel means; first coupling means adapted to be coupled with first complementary coupling means on said camera for mounting said first lens assembly unit on said camera; adapter means arranged to be rotatable relative to said first lens barrel means; retainer means adapted to cooperate with complementary retainer means on said camera for rotatively fixing said adapter means relative to said camera during mounting and dismounting of said first lens assembly unit; holding means for holding said first lens barrel means and said adapter means in a predetermined rotative position relative to each other when said first lens assembly unit is dismounted from said camera; and second coupling means; said second lens assembly unit comprising: second lens barrel means; and third coupling means adapted to be coupled with said second coupling means for coupling said first and said second lens assembly units together.

The interchangeable lens assembly may also include a diaphragm device, signal transmission means including a signal transmission member for transmitting exposure control signals between said interchangeable lens assembly and said camera, connecting means for maintaining said signal transmission member in a predetermined position relative to said adapter means and diaphragm setting means for controlling said diaphragm device to effect a degree of exposure at least in conformity with manual adjustment thereof, said diaphragm setting means being arranged to perform a presetting operation in response to manual adjustment operation after said first and said second lens assembly units are coupled together. In one aspect of the invention, the diaphragm device, the signal transmission means and the connecting means may all be formed as part of said first lens assembly unit and said diaphragm setting means may be arranged within said second lens assembly unit.

The various features of novelty which characterize the invention are pointed out with particularity in the claims annexed to and forming a part of this disclosure. For a better understanding of the invention, its operating advantages and specific objects attained by its use, reference should be had to the accompanying drawings and descriptive matter in which there are illustrated and described preferred embodiments of the invention.

DESCRIPTION OF THE DRAWINGS

In the drawings:

FIGS. 1a and 1b are sectional views showing in disassembled condition, respectively, a rear lens assembly unit and a front lens assembly unit of an interchangeable lens assembly in accordance with the present invention;

DETAILED DESCRIPTION OF THE PREFERRED EMBODIMENTS

Figure 2:
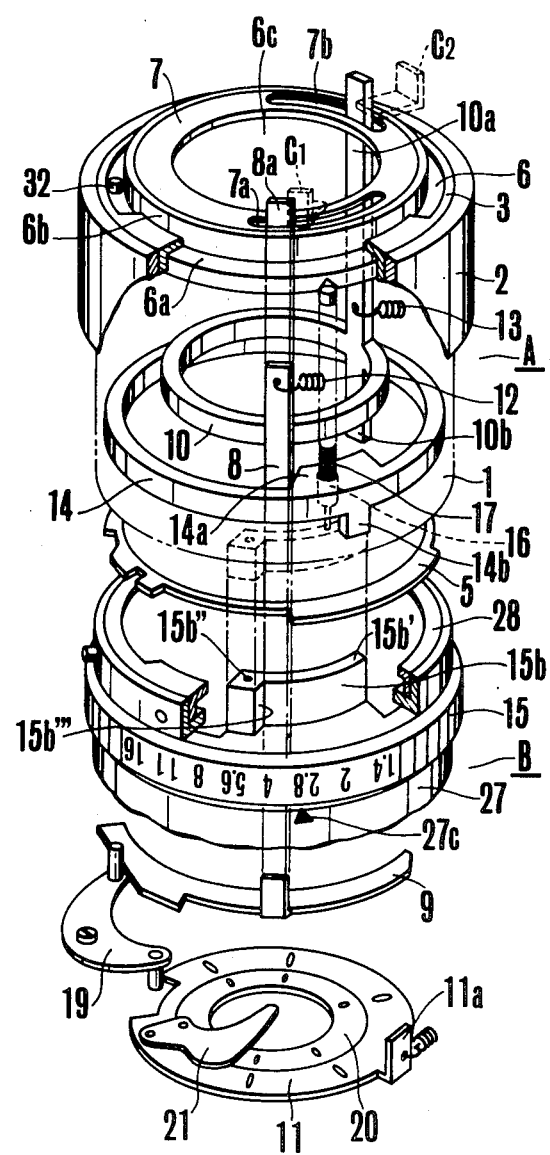
FIG. 2 is an exploded perspective view showing the overall interchangeable lens assembly in accordance with the invention, including the front and rear lens assembly units as shown in FIGS. 1a and 1b but without the optical system thereof.

Referring now to the drawings, wherein similar parts are identified with like reference characters throughout the various figures thereof, there is shown, particularly in FIGS. 1a, 1b and in FIG. 2 an interchangeable lens assembly in accordance with the present invention which includes a rear lens assembly unit A1 and a front lens assembly unit B1. The rear lens assembly unit A1 includes a bayonet member 3 which is adapted to engage a complementary bayonet member on a camera (not shown) for mounting the rear lens assembly unit A1 upon the camera. The front lens assembly unit B1 is provided with coupling means in the form of an intralens bayonet 28 which is adapted to be engaged with a complementary intralens bayonet 5, formed on the rear lens assembly unit A1, in order to enable detachable coupling of the front and the rear lens assembly units.

In the drawings, a control member C1 which is an operating element of a camera and which is adapted to engage with an operating element of the lens assembly of the present invention, as will be more clearly described hereinafter, is depicted and a second operating element C2 of the camera which may comprise an automatic stop lever which may be also provided on the camera is arranged to operate a diaphragm device disposed within the interchangeable lens assembly.

The rear lens assembly unit A1 is provided with an annular main support tube or lens barrel 1 with a bayonet support ring 2 being fixedly attached to the rear of the lens barrel 1, the lens barrel 1 and the bayonet support ring 2 being joined together to form a unified assembly.

On the outer circumference of the support ring 2 there is provided an index 2a which constitutes a mounting datum point which may be used in aligning the rear lens assembly unit A1 for mounting upon a camera. In the rear portion of the bayonet support ring 2 there is provided the bayonet member 3 which is secured by means of a screw 4, or the like.

When the lens assembly is to be mounted on a camera, the bayonet member 3 will couple with a complementary bayonet member (not shown) which is provided on the camera. The bayonet member 3 may be arranged to provide a resilient characteristic for coupling with the complementary bayonet member on the camera by provision of a slit (not shown) or of a spring (not shown).

As previously indicated, the bayonet member 5 comprises a second bayonet member which serves to couple the rear lens assembly unit A1 with the front lens assembly unit B1.

An adapter member 6 is rotatably fitted into a recessed part of the rear end face of the lens barrel 1 and the inner faces of the bayonet support ring 2 and the bayonet member 3. The adapter member 6 is provided with a fitting datum plane 6a which is used as a reference datum when mounting the rear lens assembly unit A1 upon the camera, with a tubular part 6b serving as a mounting guide when the rear lens assembly unit A1 is coupled with the camera.

The adapter member 6 also includes a rear flange 7 which is formed with an opening 6c to define an optical path for light transmission through the interchangeable lens assembly. The rear flange member 7 is fixedly attached to an inner circumferential face of the tubular part 6b of the adapter member 6.

An aperture signal transmission member 8 is provided which includes a circular annular part (not shown) carried by the inner circumferential face of the adapter member 6 through a known supporting mechanism and which is rotatable about the optical axis of the lens assembly. A rear end arm part 8a of the aperture transmission member 8 extends through an arcuate slot 7a formed in the rear flange member 7 of the adapter member 6 and the signal transmission member 8 is arranged to be placed in operating relationship with the control member C1 provided on the camera through engagement therewith of the arm end part 8a.

The fore end part of the aperture transmission member 8 is connected to and unified into a single body with an aperture cam ring 9 which will be defined in more detail hereinafter.

The lens assembly of the invention is also provided with an automatic stop ring 10 which includes an arm part 10a thereof which extends toward the rear of the lens assembly unit and which also extends through an arcuate slot 7b formed in the rear flange member 7 in order that the arm part 10a may be placed in operative engagement with the operating member C2 provided within a camera upon which the interchangeable lens assembly of the invention may be mounted. The automatic stop ring 10 is also provided with a second arm part 10b which extends toward the front of the lens assembly. The second arm part 10b is arranged to engage an engaging arm 11a of a diaphragm blade operating ring 11 of a diaphragm device which will be described in more detail hereinafter.

The automatic stop ring 10 is carried by the inner circumferential face of the adapter member 6 and it is arranged to rotate about the optical axis of the lens assembly. The signal transmission member 8 is urged by a spring 12 to rotate counterclockwise, as viewed from the rear or camera side of the lens assembly, around the optical axis. This spring member 12 is secured between the transmission member 8 and the inner circumferential face of the adapter member 6, the connection to the adapter member 6 not being shown in the drawing of FIG. 2.

The arm part or actuating member 10a of the automatic stop ring 10 is urged by a spring 13 to rotate clockwise, as viewed from the rear or camera side of the lens assembly, about the optical axis of the lens assembly. The spring 13 is also secured between the member 10a and the inner circumferential face of the adapter member 6, the connection to the adapter member 6 not being shown in the drawing.

A clutch ring 14 is arranged to connect the signal transmission member 8 with the adapter member 6 or to a diaphragm setting ring 15, which will be described in greater detail hereinafter. The clutch ring 14 is also arranged to be fitted in a recessed part formed in the main support tube or lens barrel 1 and the bayonet support ring 2 and it is thus made rotatable about the optical axis of the lens assembly. Furthermore, the clutch ring 14 is provided with a protrudent part 14a which extends radially inwardly thereof. The end face of the protrudent part 14a is in contact with the signal transmission member 8 which, as previously stated, is urged counterclockwise by the spring member 12. As will be apparent from the drawing of FIG. 2 this counterclockwise spring force will urge the signal transmission member 8 against the slanted end face of the protrudent part 14a.

A clutch pin 16 extends through a hole 14c (see FIGS. 2 and 6) formed through the clutch ring 14 with a rear end 16a of the clutch pin 16 being arranged to effect sliding contact with the bottom end face of the adapter member 6, in a manner to be more fully explained hereinafter. The rear end 16a (FIG. 8) of the clutch pin 16 is in slideable contact with the bottom face of the adapter member 6 when the rear assembly unit A1 is mounted on the camera and it will be urged by a spring 17 provided in the hole 14c to move toward the rear end of the lens assembly.

With the rear lens assembly unit A1 detached from the camera, the rear end 16a of the clutch pin 16 will fall into a tapered groove 6d provided in the bottom face of the adapter member (see FIGS. 2 and 6) while the clutch ring 14 is in engagement with the adapter member 6.

As will be apparent from FIGS. 1a and 1b, the lens assembly is provided with a lens cell member 18 arranged to have a lens optical system, including the plurality of lenses L1, L2, L3, L4, in an arrangement supported upon the main support tube or lens barrel 1 in a manner generally known to those skilled in the art.

An aperture cam ring 9, a bell crank 19, and associated parts, constitute the main elements of a diaphragm presetting mechanism of the type known to those skilled in the art. The aperture cam ring 9 and the bell crank 19 are carried by the lens cell member 18. A diaphragm blade operating ring 11 and a fixed ring 20 constitute important elements of a diaphragm device including diaphragm blades 21 arranged in operative engagement for actuation by the ring 11 and the fixed ring 20. In the drawing, only one of the diaphragm blades 21 is shown for simplicity and since a diaphragm device of the type generally known to those skilled in the art is adaptable for use with the present invention, details of the structure and operation of the diaphragm device of the lens assembly are not provided in the description contained herein. The fixed ring 20 is fixedly attached to the lens cell means and the arm part 11a of the diaphragm blade operating ring 11 is arranged to be placed in engagement with the arm 10b of the aforementioned automatic stop ring 10.

Figure 3:
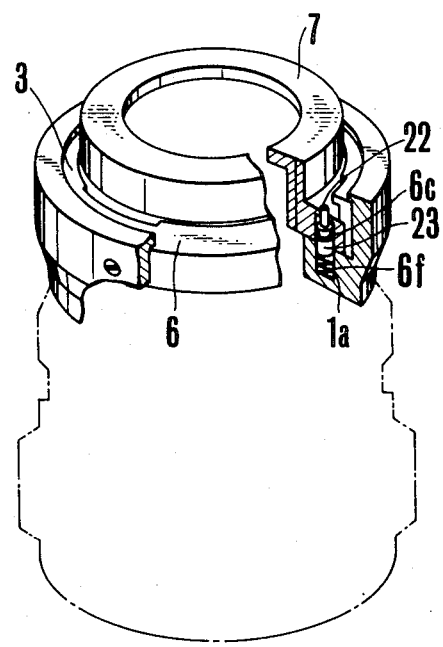
FIG. 3 is a partial perspective view, broken away and partially in section depicting a first locking mechanism utilized in the lens assembly of the invention.

FIG. 3 depicts a first interlocking mechanism which is adapted to effect a releasable locking, engagement between the main support tube or lens barrel 1 and the adapter member 6. As indicated in FIG. 3, the interlocking mechanism includes a rear lock pin 22 formed together with a forward operation pin 23, with a spring 24 being arranged to exert a spring biasing force against the pins 22 and 23 in a direction rearwardly of the lens assembly. The pin 22 is located within a hole 6f formed in the adapter member 6. The rearward end of the pin 22 is arranged to protrude rearwardly beyond the datum plane 6a of the adapter member 6. The operation pin 23 and the spring 24 are located within a hole 1a provided in the lens barrel 1.

The basic structure and operation of the interlocking means comprised of the parts mentioned above, is essentially described in prior application Ser. No. 872,102. In the operation of this interlocking means, when the rear lens unit A1 is dismounted from the camera, the adapter member 6 and the lens barrel 1 will have been rotated relative to each other so that the holes 6f and 1a will be in essential alignment and coincide with each other taken in the direction of the optical axis. As a result, the rear end of the lock pin 22 will be pressed by the spring 24 to extend rearwardly beyond the datum plane 6a while the operation pin 23 will be located to extend across the interface between the adapter member 6 and the main support tube 1. As a result, the pin 23 will prevent rotative movement between the lens barrel 1 and the adapter member 6 thereby maintaining these members rotatively locked relative to each other.

However, when the rear lens unit A1 is brought into engagement with the camera in order to enable mounting of the lens unit upon the camera, the datum plane 6a will be brought into contact with a cooperating part of the camera and the cooperating part of the camera will cause the lock pin 22 to be pressed forwardly of the lens assembly against the force of the spring 24 whereby the pin 23 will be moved so that it will be axially removed from the interfacing planes of the adapter member 6 and the lens barrel 1. As a result, the pin 23 will be wholly contained within the hole 1a, thereby releasing the interlocking effect and enabling the lens barrel 1 to be rotated relative to the adapter member 6. It will be apparent that with the adapter member 6 and the lens barrel 1 moved rotatively relative to each other out of the position depicted in FIG. 3, the pins 23 and 22 will be retained, respectively, within the holes 1a and 6f until the rotative alignment depicted in FIG. 3 is reestablished whereupon the interlocking force of the pin 23 will be reestablished when the rear lens unit A1 is moved away from the interfacing portion of the camera.

Figure 4:
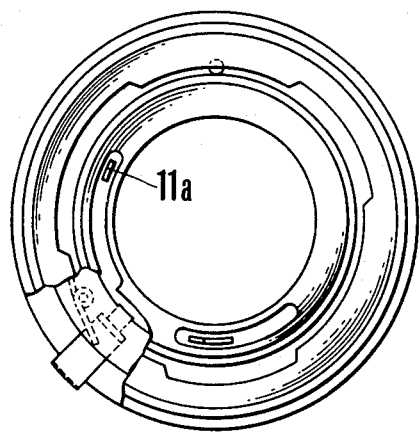
FIGS. 4 and 5 are, respectively, a partially cutaway rear view and an exploded perspective view showing a second locking mechanism utilized with the lens assembly of the invention.
Figure 5:
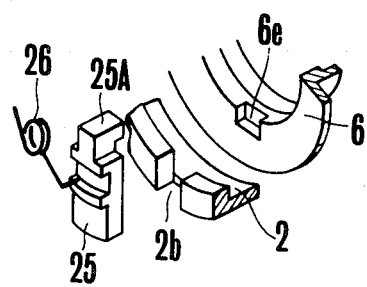

A second lock mechanism which also effects interlocking engagement between the adapter member 6 and the lens barrel 1, but at a different rotative relative position therebetween than the locking engagement established by the first interlocking mechanism previously described, is depicted in FIGS. 4 and 5. As was previously indicated, when the interlocking engagement of the pin 23 is released, the lens barrel 1 will be rotated relative to the adapter member 6 and relative to the camera so that the bayonet member 3 will be brought into locking engagement with a complementary bayonet member from the camera. During this relative rotation, the adapter member 6 is maintained rotatively fixed relative to the camera by retainer means which will be described in more detail hereinafter. With the adapter member 6 rotatively fixed relative to the camera and with the lens barrel 1 locked upon the camera by the interengagement between the bayonet member 6 and the complementary bayonet member on the camera, the lens barrel 1 may be maintained releasably locked relative to the camera by the second locking mechanism depicted in FIGS. 4 and 5 which effects interlocking engagement between the lens barrel 1 and the adapter member 6 at an angular position other than the angular position at which the lock pin 23 effects interlocking engagement. As will be apparent from the description contained herein, the lens barrel 1 is interlocked with the adapter member 6 by the pin 23 when the rear lens unit A1 is dismounted from the camera. However, the second interlocking mechanism depicted in FIGS. 4 and 5 effects locking engagement between the lens barrel 1 and the adapter member 6 when the rear lens assembly unit A1 is mounted upon the camera.

As shown in FIGS. 4 and 5, the second locking mechanism includes a release member 25 which is arranged to have a fore end thereof protrude and be insertable into a lower part of the support ring 2. A spring member 26 is arranged to have one end thereof engage the lens barrel 1 while a bent part at the other end of the spring 26 is arranged to engage into a stepped portion of the release member 25 in order to impart thereto a spring force tending to maintain a lock pin 25a of the release member 25 in locking engagement with a locking groove 6e formed in the adapter member 6. Thus, with the release member 25 slideably engaged within a slot 2b formed in the support ring 2, which is fixedly engaged with the lens barrel 1, and with the lock pin 25a engaged within the groove 6e, the lens barrel 1 will be held in rotatively locked engagement with the adapter member 6.

The slot 2b and the groove 6e are angularly arranged on the support ring 2 and the adapter member 6, respectively, so that they will coincide with each other when engagement between the lens unit bayonet member 6 and the bayonet member on the camera has been completed and when the lens barrel 1 has been fully rotated to effect appropriate locking engagement between the respective bayonet members. At this point of relative angular rotation between the lens barrel 1 and the adapter member 6, the lock pin 25a will fall into the groove 6e by the force of the spring 26 and the lens barrel 1 and the adapter member 6 will be maintained rotatively locked until the release member 25 is pressed radially inwardly of the lens assembly to move the lock pin 25A out of the slot 6e. Since the adapter member 6 is rotatively locked relative to the camera by the aforementioned retainer means, the overall lens assembly including the rear lens assembly unit A1 will be maintained locked upon the camera until depression of the release member 25 is effected to enable reverse rotation of the lens barrel 1 to release the interlocked bayonet members. Since the second locking mechanism depicted in FIGS. 4 and 5 restricts rotation of the lens barrel 1 relative to the camera and relative to the adapter 6, the entire lens assembly will remain locked upon the camera to preclude any possibility of its being inadvertantly detached therefrom due to inadvertent rotation of any part of the lens assembly, this locking engagement being maintained, as previously indicated, until the release member 25 is depressed.

Figure 9:
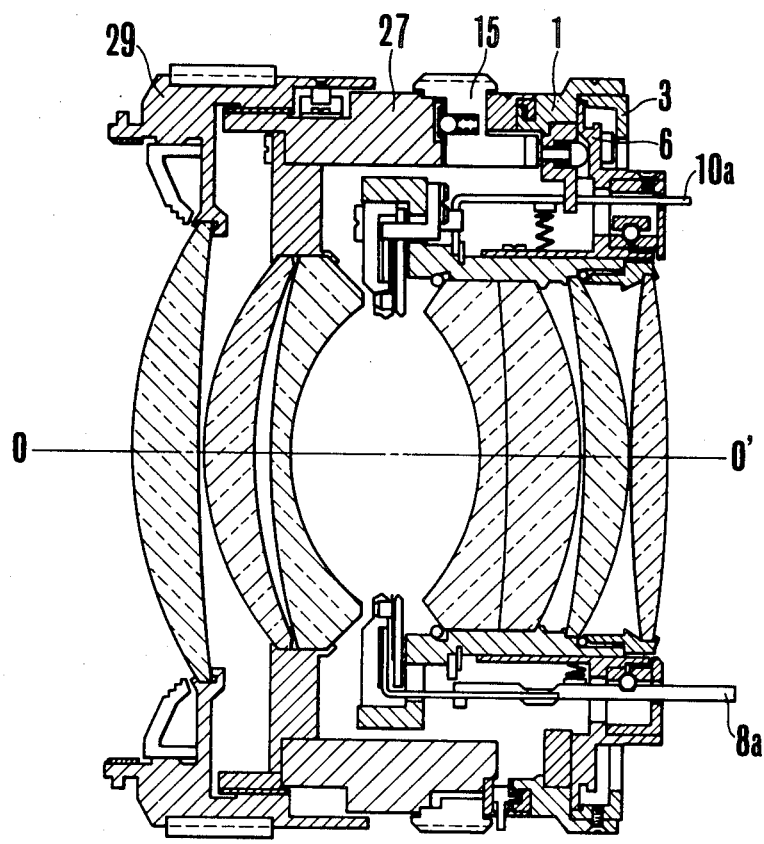
FIG. 9 is a cross-sectional view showing the embodiment of FIG. 8 with the front and rear lens assembly units joined together.
Figure 10A:
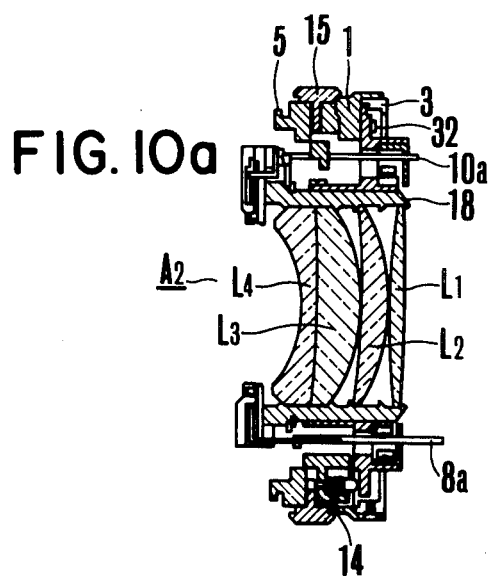
FIGS. 10a and 10b are sectional views showing other embodiments of rear lens assembly units in accordance with the present invention.
Figure 11A:
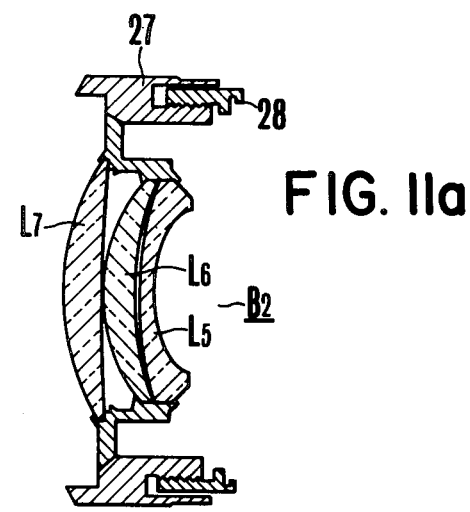
FIGS. 11a and 11b are sectional views showing front lens assembly units in accordance with the present invention, with the units depicted in FIGS. 11a and 11b being interchangeably connectable with either or both of the units depicted in FIGS. 10a and 10b.
Figure 10B:
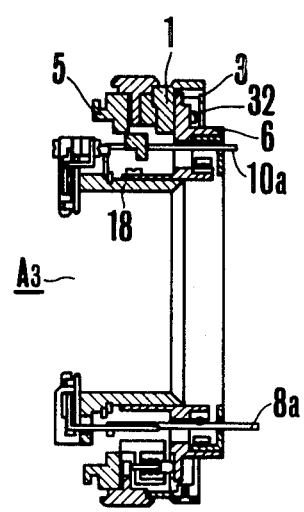
Figure 11B:
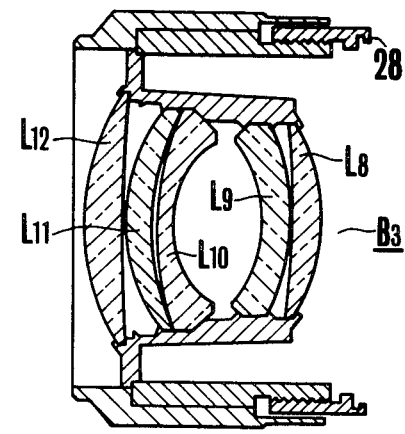

The front lens assembly unit B1, as best seen in FIGS. 1b and 9 includes a main support tube or lens barrel 27 which is provided at the rear end thereof with a bayonet member 28 fixedly attached thereto, the bayonet member 28 being adapted to couple with the bayonet member 5 formed in the rear lens assembly unit A1. The front and rear lens assembly units B1, A1 are shown in their detached condition in FIGS. 1a, 1b and in their attached condition in FIG. 9.

The fore end of the main support tube or lens barrel 27 is provided with a helicoid part 27a which is arranged to be in threaded engagement with a focusing ring 29 and to permit movement of a focusing lens optical system L7 by appropriate displacement along the optical axis of the lens assembly. The device is provided with stoppers 27b and 29a which cooperate in effecting the desired focusing operation.

On the periphery of the main support tube 27 there is provided the diaphragm setting ring 15 which is fitted to be rotatable about the optical axis of the lens system. The diaphragm setting ring 15 is conventionally provided with graduated index markings 1.4, 2, 2.8, etc. representing desired values for the aperture settings to be effected. A click mechanism of the type known to those skilled in the art is provided by inclusion of balls 30, spring 31, etc. whereby the click mechanism will cause the diaphragm setting ring 15 to effect a clicking feel to manipulation of the ring 15 in order to provide an indication when each of the graduated index markings 1.4, 2, etc. is adjustably set in alignment with an aperture index member 27c best seen in FIG. 2.

Figure 6:
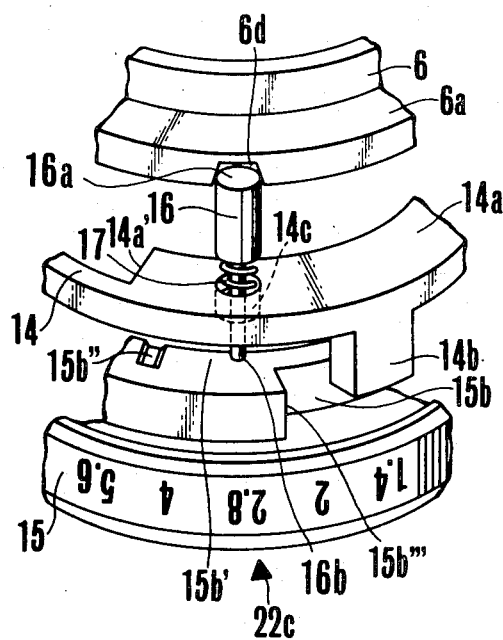
FIG. 6 is a perspective view showing the essential parts of a clutch mechanism employed in the embodiment shown in FIG. 2.

The diaphragm setting ring 15 is provided with a protrudent part 15b best seen in FIGS. 2 and 6 which defines a sliding face 15b' arranged to have the fore end part 16b of the clutch pin 16 in abutting sliding engagement thereon when the front lens assembly unit B1 is coupled with the rear lens assembly unit A1. A tapered groove 15b" is arranged to have the fore end part 16b become engaged therein and an engaging face 15b''' is arranged to engage with the extended arm 14b of the clutch ring 14.

When the front and rear lens barrel units B1 and A1 are mounted upon the camera in operative engagement therewith, the datum plane 6a of the adapter member 6 is brought into position relative to the camera so that a positioning pin 32 formed to extend rearwardly therefrom is brought into engagement with retainer means formed in the camera which will engage the positioning pin 32 to insure that a correct positional relationship is established between the rear lens barrel unit A1 and the camera. When the positioning pin 32 is inserted into a retaining recess (not shown) provided in the camera, the adapter member 6 will be fixed in a predetermined rotative position relative to the camera and the engagement of the pin 32 with a complementary retainer slot (not shown) formed in the camera will operate to prevent rotative movement of the adapter 6 relative to the camera. Upon occurrence of this engagement, the lock pin 22 of the first lock mechanism shown in FIG. 3 will be pushed against the force of the spring 24 to release the adapter member from the lens barrel 1 which is then made rotatable relative to both the adapter member 6 and the camera for mounting of the lens unit A1 upon the camera by engagement of the bayonet devices. It will be apparent that the lens assembly may be grasped at virtually any point along its length in order to effect appropriate mounting engagement of the bayonet members.

Of course, when the bayonet member 3 has been rotated a sufficient degree to effect firm locking engagement with the bayonet member of the camera, rotation of the lens barrel to this predetermined degree will cause the second locking mechanism depicted in FIGS. 4 and 5 to effect locking action between the lens barrel and the adapter thereby essentially locking the entire lens assembly relative to the camera. In mounting the rear lens assembly unit A1 on the camera, the aperture signal member 8a and the automatic stop lever or arm 10a which are carried by the adapter member 6 remain essentially unmoved by the mounting rotation of the lens barrel and they are thus maintained in a predetermined positional relationship, respectively, relative to the actuating members C1 and C2 located in the camera.

Of course, if during the time that the rear lens assembly unit A1 is mounted on the camera, the front lens assembly unit B1 is not yet mounted upon the unit A1, then during the rotation of the lens barrel 1, the clutch pin 16 will be maintained in a fixed position relative to the adapter member 6 as a result of the engagement of the rear end 16a within the groove 6d provided in the bottom face of the adapter member 6.

The front lens assembly unit B1 may be connected with the rear lens assembly unit A1 when an index marker (not shown) provided on the rear lens assembly unit A1 and an index marker provided on the front lens assembly unit B1 are placed in alignment to coincide with each other. Then, the second bayonet member 5 of the rear unit A1 and the bayonet member 28 of the front unit B1 will coincide and be in a relationship relative to each other appropriate to enable interlocking engagement therebetween, with the forward end 16b of the clutch pin 16 being brought into position to abut the end face 15b' of the protrudent part 15b of the diaphragm setting ring 15.

With the parts in this condition, when the main support tube 27, the focusing ring 29, the diaphragm setting ring 15, etc., of the front unit B1 are grasped and rotated, the engaging face 15b''' of the protrudent part 15b of the diaphragm setting ring 15 will be brought into engagement with the arm 14b of the clutch ring 14. With the parts in this condition, the degree of rotation of the front unit B1 necessary to bring the engaging face 15b''' into engagement with the arm 14b will vary depending upon the aperture value which has been set upon the diaphragm setting ring 15. Obviously, the set value will determine the proximity of the face 15b''' with the arm 14b at the point where the parts are first brought together. As shown in FIG. 6, when the front unit B1 is rotated, the end face 15b' and the forward end 16b of the clutch pin 16 will be brought into sliding engagement and when the front unit B1 is rotated to a position where the arm 14b abuts with the engaging face 15b''', the end 16b will fall into the tapered groove 15b''' and the rear end 16a of the clutch pin 16 will disengage from the tapered groove 6d and will slide along the undersurface of the adapter member 6. As a result, the clutch ring 14 will be disengaged from the adapter member 6 and it will be joined with the diaphragm setting ring 15. With the parts in this position, the adapter member 6 will remain fixedly attached to the camera and the rear end 16a of the clutch pin 16 will generally come to rest at the position indicated in FIG. 8.

Figure 7:
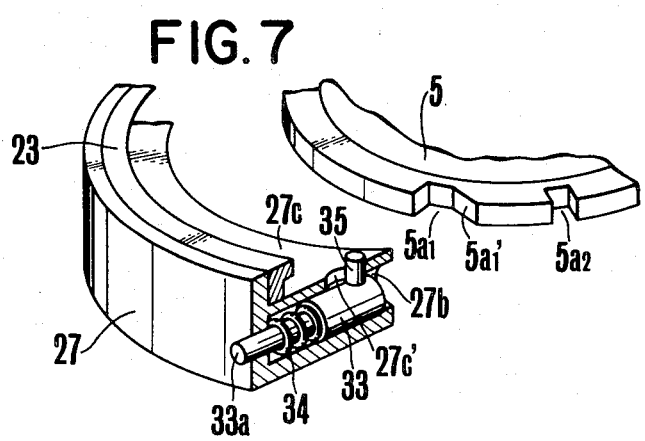
FIG. 7 is a partial perspective view showing a third locking mechanism utilized in the lens assembly of the invention to couple the front and rear lens assembly units thereof.

When the front and rear assembly units B1 and A1 have been sufficiently rotated so that the respective bayonet members thereof couple the units together, a third locking mechanism depicted in FIG. 7 will operate to maintain the interengaged condition of the units. As shown in FIG. 7, the third locking mechanism is composed of a claw part 5a which is formed as part of the bayonet member 5 located on the rear lens assembly unit A1. The claw part 5a defines two notches 5a1 and 5a2. The notch 5a1 has a tapered side face 5a1'. A lock member 33 is provided within a hole 27d provided in the main support tube 27 with the lock member 33 being urged by a spring 34 in the direction of the optical axis of the assembly. The lock member 33 is provided with a pin 35 which is arranged to protrude out of a slot 27c' formed in the flange 27c of the main support tube 27. In coupling the bayonet member 5 of the rear assembly unit A1 with the bayonet member 23 of the front assembly unit B1, when the front assembly unit B1 is rotated to a predetermined degree, the lock pin 35 will be locked in the notch 5a2 to inhibit further rotation of the front unit B1. The front unit B1 will then be locked in this position by the third locking mechanism described.

Figure 8:
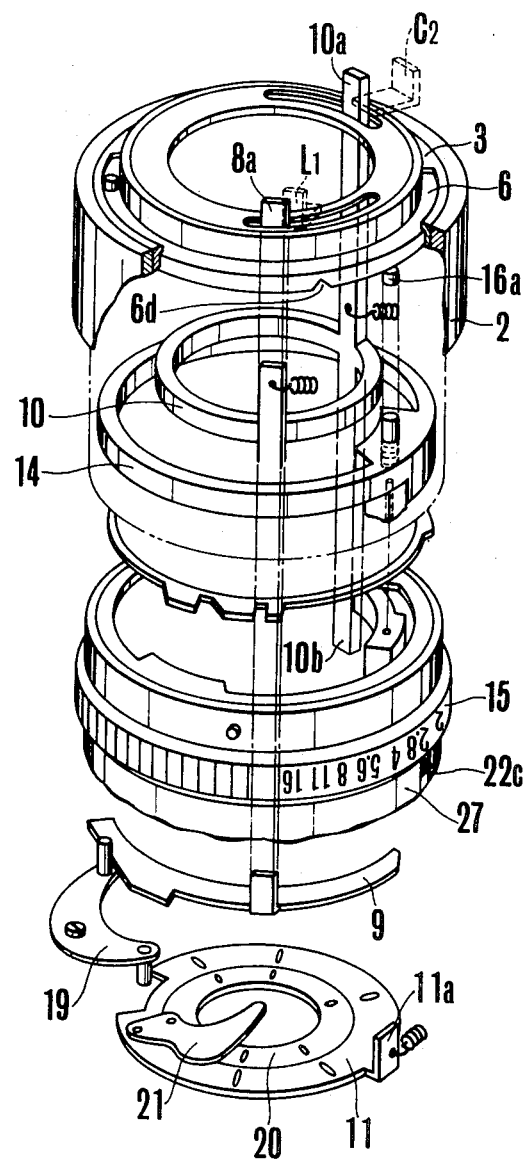
FIG. 8 is a perspective view showing the essential parts of the lens assembly of the invention and depicting the positions thereof with the assembly connected with a camera.

Meanwhile, when the clutch ring 14 comes into engagement with the diaphragm setting ring 15, the spring 12 will cause the signal transmission member 8 to come into contact with the end face 14a' of the protrudent part 14a and the signal transmission member 8 will then move in accordance with the set aperture value on the diaphragm setting ring 15 so that a manual presetting of the diaphragm aperture is effected (see FIG. 8).

Referring now to FIGS. 8 and 9, it will be seen that the interchangeable lens assembly of the embodiment just described operates in a manner whereby in a manual aperture value setting operation, when each of the graduated aperture markings provided on the diaphragm setting ring 15 is adjusted into alignment with the index 27c, rotation of the diaphragm setting ring 15 will be transmitted to the clutch ring 14. The spring 12 then causes the signal transmission member 8 to follow the rotation of the diaphragm setting ring 15 and to move to a position corresponding to the set aperture value. This action of the signal transmission member 8 will cause the presetting cam ring 9 to rotate in order to effect a presetting operation in accordance with the manually set value. The rear end part 8a of the signal transmission member 8 moves the interlocking actuation member C1 disposed in the camera to a position corresponding to the manually set value. Information representing the manually set aperture value of the lens is thus transmitted through the interlocking or actuating member C1 to a known exposure control mechanism provided in the camera.

With this arrangement, a shutter release action occurring in the camera will cause the actuating member C2 to rotate counterclockwise from the position shown in FIG. 8. This rotation of the actuation member C2 will drive the diaphragm blade operating ring 11 through the operation member 10 thereby effecting actuation of the diaphragm blades 21. It will be apparent to those skilled in the art that the actuation of the diaphragm blades 21 will occur in accordance with the set position of the aperture cam ring 9 as a result of the engagement with the cam surface of the cam ring 9 by the cam follower on the bell crank 19.

In the case of automatic exposure control operation of the camera, the lens units A1 and B1 will be mounted on a camera which is provided with automatic exposure control means (not shown). The aperture value information Av is computed from information Bv representing the brightness of an object to be photographed, film sensitivity information Sv, shutter speed information Tv, etc. The aperture value information Av is represented by the extent of displacement of the interlocking member C1 from its initial position. The actuating member C2 rotates in response to the release of the release mechanism provided in the camera and rotation of the actuation member C2 drives the operating ring 11 through the operation member 10 provided in the lens assembly. The driving force of the operating ring 11 stops down the opening of the diaphragm blade 21 to an aperture value corresponding to the aperture value information after the signal transmission member 8 is brought into contact with the interlocking member C1 through the bell crank 19 and the cam ring 9.

In order to detach the rear assembly unit A1 from the camera the locking engagement effected by the second locking mechanism depicted in FIGS. 4 and 5 must first be released. When the operation member 25 is pushed against the force of the spring 26, the pin 25a disengages from the groove 6e whereby the lens barrel 1 may be rotatable relative to the adapter means 6. Detaching operation is performed by grasping the lens barrel of the rear unit A1, and rotation of the lens barrel to an angular position at which the respective bayonet members are released will enable detachment of the assembly from the camera. During this detaching operation, the clutch ring 14 rotates together with the lens barrel 1, the bayonet support member 2 and the front assembly unit B1, assuming that it is mounted on the rear unit A1. Then, when the rear end 16a of the clutch pin 16 falls into position in the tapered groove 6d of the adapter member 6, the spring 17 will cause the clutch pin 16 to move into the tapered groove 6d whereupon the clutch ring 14 will be again held in connection with the adapter member 6. The signal transmission member 8a which is urged by the end face 14a' then will be brought to its initial position against the edge of the arcuate slot 7a.

In an arrangement where the rotation angle which is required for releasing the bayonet member of the rear assembly unit A1 from the camera is greater than the rotation angle of the signal transmission member 8 required to bring the member 8a into predetermined position relative to the adapter member 6, the lens barrel 1 of the rear assembly unit A1 will further rotate clockwise after the signal member has been brought to a stop at a predetermined point relative to the adapter member 6. Further rotation of the lens barrel 1 will continue until it is stopped by rotation stopping means (not shown) which may be provided for the lens barrel 1, the bayonet ring 2, etc., the release of the bayonet coupling of the unit A1 from the camera being accomplished when this stop action occurs. In removing the rear unit A1 from the camera, the first lock mechanism shown in FIG. 3 will of course operate as previously described to again interlock the adapter member 6 and the lens barrel 1 against relative rotation therebetween.

In removing the front assembly unit B1 from the rear assembly unit A1, which may, of course, be left attached with the camera during such separation, the main support tube or lens barrel 27 is rotated counterclockwise at the same time that the third locking mechanism shown in FIG. 7 is released. This operation will cause the lock pin 34 of the third lock mechanism to disengage from the notch 5a2 and rotation of the diaphragm setting ring 15 will cause the clutch ring 14 to rotate counterclockwise together with the ring 15. The rear end 16a of the clutch pin 16 will fall into the tapered groove 6d provided in the bottom of the adapter member 6 and this will cause the diaphragm setting ring 15 to disengage from the clutch ring 14. When the main support tube 27 rotates to a predetermined angle, the bayonet members 5 and 23 will be released to permit removal of the front unit B1 from the rear unit A1. In this case, also, counterclockwise rotation of the clutch ring 14 causes the transmission member 8 to be pushed by the end face 14a' of the protrudent part 14a against the force of the spring 12 and the transmission arm 8a will come into its predetermined position where it will be held when the clutch ring 14 is interlocked with the adapter member 6.

Figure 12:
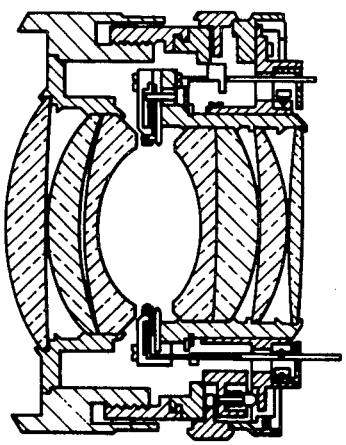
FIG. 12 is a sectional view of an interchangeable lens assembly in accordance with the present invention comprising the rear lens assembly unit shown in FIG. 10a and the front lens assembly unit shown in FIG. 11a coupled together.
Figure 13:
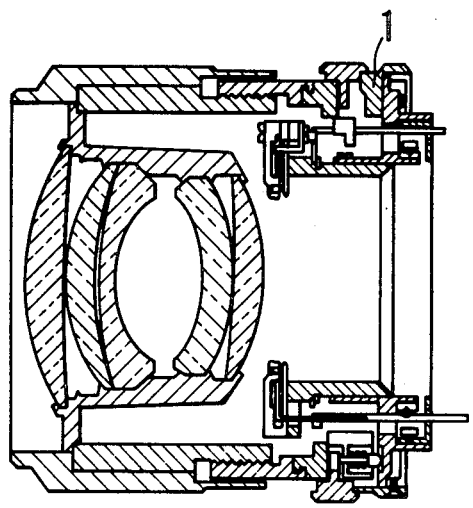
FIG. 13 is a cross-sectional view of an interchangeable lens assembly in accordance with the present invention comprising the rear lens assembly unit depicted in FIG. 10b and the front lens assembly unit depicted in FIG. 11b coupled together.

FIGS. 10a through 13 illustrate a further embodiment of the invention wherein the diaphragm setting ring is carried by the rear lens assembly unit. As previously indicated, the units A2 and A3 shown in FIGS. 10a and 10b respectively are rear units and either may carry the diaphragm setting ring while only a focusing lens optical system is carried by the complementary front lens barrel unit which may be either of the units B2 or B3 shown, respectively, in FIGS. 11a and 11b. In FIGS. 10a–13, similar reference numerals designate similar parts. FIG. 12 depicts an example of an interchangeable lens assembly which is obtained by combining the rear unit A2 with the front unit B2 whereas FIG. 13 shows another interchangeable lens assembly obtained by combining rear unit A3 with front unit B3. The rear units A2 and A3 are arranged to carry a diaphragm device including the elements 11, 20 and 21, a diaphragm presetting mechanism including the elements 9 and 19, a clutch mechanism including the elements 14, 16 and 17 and a diaphragm setting ring 15. The front units B2 and B3 are arranged to carry only the focusing lens system. This arrangement obviates the necessity for interlocking relationship between the front and rear assembly units so that the possibility of operating difficulties which might arise in connection with the precision required for interlocking mechanisms and due to fatique and/or wear of parts may be precluded.

Figure 14:
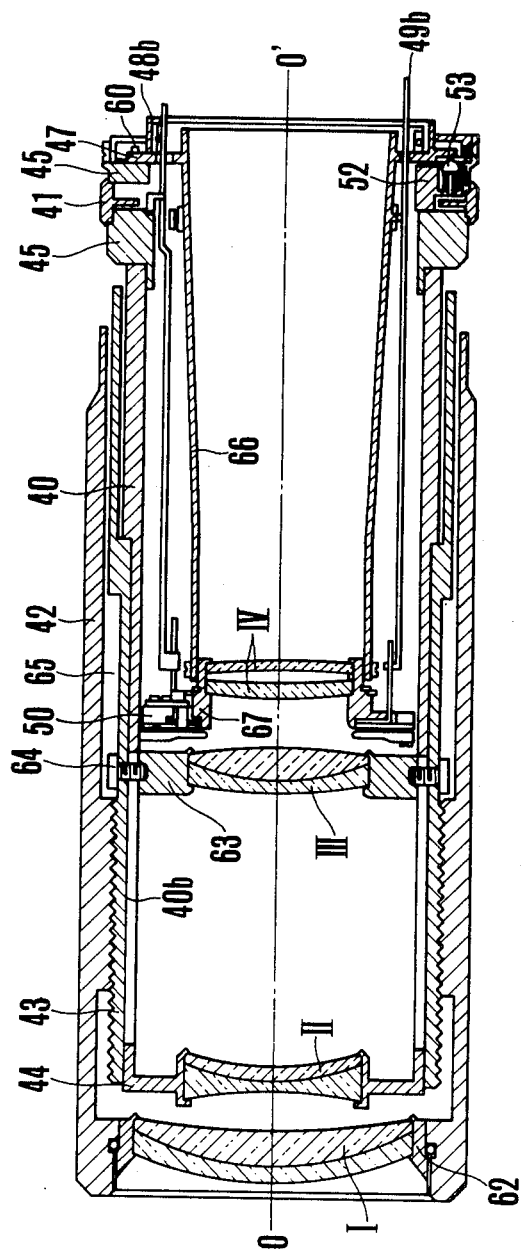
FIG. 14 is a sectional view of a further embodiment of the invention.
Figure 15:
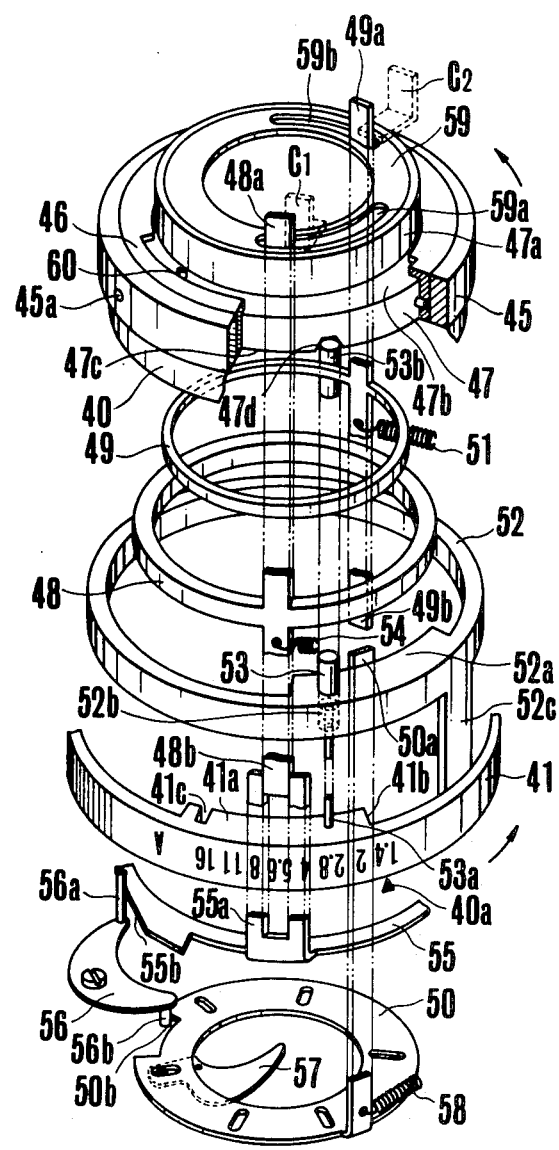
FIG. 15 is an exploded perspective view showing the embodiment of FIG. 14.

FIGS. 14 and 15 show a further embodiment of the invention wherein the zoom lens barrel is arranged into a single unified body. Referring to the drawings, there are provided a main support tube 40 which is formed into an annular shape and which has a distance adjusting screw engagement part disposed at the inside of the fore end thereof. An index 40a for adjustment of the graduated aperture value is provided on a diaphragm setting ring 41 which will be described hereinafter. A zoom ring 42 is provided in threaded engagement with an intermediate helicoidal ring 43 fitted onto the main support tube 40. A lens carrying member 44 is arranged to carry at least a part of a lens optical system L. A bayonet mount support ring 45 is fixedly attached to the rear end of the main support tube 40 and is provided with an index 45a disposed on the periphery thereof for indicating a mounting datum point to be utilized in mounting the lens on the camera. The aforementioned diaphragm setting ring 41 is rotatably fitted into a recessed annular part formed jointly by the main support tube 40 and the bayonet mount support ring 45 and is provided with manual aperture value setting graduated markings 1.4–16 and an automatic adjustment index mark A. A bayonet member 46 is secured to the rear end of the bayonet mount support ring 45 and is arranged to perform a clamping action on a bayonet ring disposed on the camera when the lens is mounted on the camera. In order to effect the bayonet coupling with the camera bayonet mechanism, either a slit (not shown) which may be formed in a part of the bayonet member 46, or a spring member (also not shown) may be provided.

An adapter member 47 is rotatably fitted into a recessed annular part formed jointly by the rear end face of the main support tube 40 and a stepped part formed on the inside of the bayonet member 46. The adapter member 47 is provided with a fitting bottom member which is formed into a cylindrical shape to be used in the coupling operation with a camera. A rear wall member 59 defines a light transmitting opening coaxial with the optical axis of the assembly. In the rear wall member 59 there are provided arcuate slots 59a and 59b which are arranged to enable the signal transmission members 48a and 49a to extend therethrough into operative engagement with the camera.

A positioning pin 60 is provided on the datum plane of the adapter member 47 for alignment of the assembly with the camera, this pin being arranged to be fitted into a retaining positioning groove (not shown) which is formed in the camera in the bayonet member thereof in order to rotatively lock the adapter member 47 relative to the camera during mounting operation.

An aperture signal member 48 having as a first arm part thereof the signal member 48a is also provided with the member 48a being arranged to engage a signal member C1 arranged in the camera in order to effect proper exposure control cooperation. The aperture signal transmission member 48 is fitted into a part of the adapter member 47 (not shown) and arranged to extend in the axial direction thereof, the transmission member 48 being thus arranged to be rotatable about the optical axis of the system and to have movement in the direction of the optical axis restricted. The aperture signal transmission member is provided with a second arm 48b which is arranged to be in cooperative association with the diaphragm presetting mechanism shown in FIG. 2.

Furthermore, the aperture signal transmission member 48 is urged to rotate counterclockwise by a first spring 54 which is disposed between the aperture signal transmission member 48 and the adapter member 47.

The diaphragm unit shown in FIG. 2 is arranged to be operated by an automatic stop ring 49 in response to a driving force exerted from operative components in the camera. The automatic stop ring 49 is fitted into the stem of the aforementioned extended part of the adapter member 47 and it is arranged to be rotatable about the optical axis.

A first arm part forms the first signal transmission member 49a which extends from a part of the automatic stop ring 49 toward the camera and which is arranged to enable cooperative engagement with an actuating member C2 provided in the camera. A second arm part 49b of the ring 49 which extends in the opposite direction is arranged to enable engagement with the arm part 50a of a diaphragm driving ring 50 of the aforementioned diaphragm unit.

The automatic stop ring 49 is urged to rotate clockwise by a second spring 51 which is disposed between the automatic stop ring and the adapter member 47. This urging force of the second spring 51 brings the automatic stop ring 49 into contact with one end of the slot 59b provided in the rear wall member 59, and the ring 49 is set in this position.

In a condition prior to mounting of the lens assembly on the camera, as shown in FIG. 15, the second arm 49b of the automatic stop ring 49 maintains a predetermined distance away from the arm 50a of the diaphragm driving ring 50. When the lens assembly is mounted on the camera whereby the mounting operation causes the main support tube 40, the bayonet mount support 45 and the bayonet member 46 to rotate relative to the adapter member 47, the diaphragm driving ring 50 will also be rotated counterclockwise to cause the arms 50a and 49b to engage with each other.

A clutch ring 52 is interposed between the rear recessed annular part (not shown) of the main support tube 40 and the fore end face of the bayonet mount support ring 45 and it is arranged to be rotatable around the optical axis. The clutch ring 52 is provided with a protrudent part 52a which extends from a part of the ring 52 in the direction of the optical axis and a hole 52b which is formed in the part 52a in a direction parallel with the optical axis. A clutch pin 53 is fitted into the hole 52b and the fore end 53a of the clutch pin 53 is disposed on a locking part 41a which is formed to extend from a part of the aforementioned diaphragm setting ring 41 in the direction of the optical axis. The rear end 53b of the clutch pin 53 is arranged to be capable of engaging a tapered groove 47d formed in the fore end face 47c of the adapter member 47.

One end face of the aforementioned part 52a is in contact with the arm 48b of the aperture signal transmission member which is urged counterclockwise by the spring 54. With the lens assembly dismounted from the camera, the positions of the arms 48a and 48b of the aperture transmission member are determined by the end face of the protrudent part 52a.

A presetting cam ring 55 is rotatably carried by the adapter member 47. A forked arm 55a which extends from a part of the cam ring 55 toward the rear of the lens assembly engages a second arm 48b of the aperture signal transmission member. The presetting cam ring 55 is also provided with a cam face 55b. A first pin 56a of a bell crank 56 which is pivotally and swingably carried by the adapter member 47 is arranged to come into contact with the cam face 55b. The bell crank 56 is provided with a second pin 56b which is disposed opposite to the first pin 56a and is arranged to engage the aforementioned diaphragm driving ring 50 through its engaging part 50b.

The diaphragm device includes diaphragm blades 57 and a spring member 58 which is disposed between the arm part 50a of the diaphragm driving ring 50 and the adapter member 47 to urge the diaphragm ring 50 counterclockwise and thus to actuate the blades 57. Since the presetting mechanism 55 and 56 and the diaphragm device 50, 57 and 58 are of a known structural arrangement, further details thereof are omitted.

A first optical system I is carried at one end of the zoom ring 42 through a support ring 62. A third optical system III is carried inside the main support tube 40 and is kept in a fixed relationship relative to the intermediate ring 43 through a key 64. The key 64 is arranged to be movable and to extend through a straight moving groove 40b provided in the aforementioned main support tube 40 and to be movable inside of a key sliding groove formed jointly by the zoom ring 42 and the intermediate ring 43 in the direction of the optical axis. The adapter member 47 is arranged to extend continuously from the inner barrel 66 which is provided with a support ring 67 which is arranged at one end thereof to carry a fourth optical system IV.

In the operation of the embodiment of FIGS. 14 and 15, when the zoom lens barrel is to be mounted in the camera, the zoom ring 42 is grasped and the lens barrel is inserted into a coupling face (not shown) provided on the camera with the fore end protrudent part of the adapter member being used as a guide for insertion. While maintaining the adapter member and the camera in a predetermined positional relationship by the aid of positioning pin 60 provided on one face of the member 47, the zoom ring 42 is rotated about the optical axis O-O' and as a result of this rotation, the bayonet member 46 is caused to engage with coupling means provided on the camera and the lens is thus mounted on the camera. Since the adapter member is then attached to the camera in a predetermined position, the arm 48a of the aperture signal transmission member 48 and the first arm 49a of the automatic stop ring 49 which are interlocked with the diaphragm device which is in a fixed relationship relative to the adapter member 47 are maintained in interlocking cooperative association in their predetermined positions with corresponding interlocking or actuating members of the camera (not shown).

The zoom lens of this embodiment is of the type which is arranged to perform zooming and distance adjustments. In the zooming operation, when the zoom ring 42 is moved in the direction of the optical axis, the intermediate ring 43 moves concurrently with the zoom ring 42. Then, the key 64 which is secured to the intermediate ring 43 moves within the straight moving groove 40b of the main support tube 40. Movement of the key 64 causes the third optical system to move in the direction of the optical axis together with the second optical system to vary the magnification by changing the focal length. The distance adjustment is affected by rotating the zoom ring 42 in order thereby to move the first optical system I forwardly and rearwardly along the optical axis.

As described in the foregoing, in accordance with the present invention, the interchangeable lens assembly may be formed of a plurality of assembly units which may comprise front and rear units with the optical system of the lens arranged to be carried by the front assembly unit or a plurality of front units may be arranged to permit combinations with a plurality of rear units with the optical system arranged to be carried jointly by the front and rear units. Thus, an interchangeable lens assembly having a desired aperture ratio, a desired focal length, etc. can be achieved by selectively combining the desired lens assembly units.

It is an important feature of the invention that the rear lens unit be provided with the adapter member 6 or 47 which is made rotatively fixed relative to the camera during mounting of the lens assembly on the camera. A bayonet member is secured to the main support tube or lens barrel 1 or 40 which is rotatable relative to the adapter member. A signal member 8a or 48a is arranged to be carried by the adapter member. Further, there is provided a clutch ring 14 or 52 arranged to maintain the interlocking relationship between the diaphragm setting ring and the signal member 8a to insure improved accuracy for the transmission of exposure control signals between the lens assembly and the camera.

While specific embodiments of the invention have been shown and described in detail to illustrate the application of the inventive principles, it will be understood that the invention may be embodied otherwise without departing from such principles.

What is claimed is:

1. An interchangeable lens assembly for a single lens reflex camera having complementary coupling means and complementary retainer means thereon comprising:
   a first lens assembly including
      first lens barrel means,
      first coupling means adapted to be engaged with said complementary coupling means on said camera by rotative operation of said first lens barrel means when said interchangeable lens assembly is mounted on said camera so as to couple said interchangeable lens assembly with said camera,
      adapter means mounted inside said first lens barrel means and arranged to be rotative relative to said first lens barrel means,
      retainer means operating in cooperation with said complementary retainer means on said camera so as to fix said adapter means on said camera,
      light control means for controlling the light entering said camera through said interchangeable lens assembly either by manual operation thereof or in response to exposure information from said camera,
      signal transmission means including a signal transmission member held by said adapter means for transmission of exposure control signals between said interchangeable lens assembly and said camera, and
      second coupling means arranged at one end of said first lens barrel means;
   a second lens assembly including
      second lens barrel means, and
      third coupling means for coupling said second lens barrel means with said first lens barrel means,
      said second lens barrel means having a focus adjustable phototaking lens.

2. An interchangeable lens assembly according to claim 1 wherein said first lens barrel means includes a lens optically cooperating with said phototaking lens in said second lens barrel means.

* * * * *